United States Patent
Nishigaki

(10) Patent No.: US 9,581,685 B2
(45) Date of Patent: Feb. 28, 2017

(54) ULTRASONIC DIAGNOSTIC APPARATUS WITH PULSE TIMING CONTROLLER

(75) Inventor: Morio Nishigaki, Kanagawa (JP)

(73) Assignee: KONICA MINOLTA, INC., Tokyo (JP)

( * ) Notice: Subject to any disclaimer, the term of this patent is extended or adjusted under 35 U.S.C. 154(b) by 623 days.

(21) Appl. No.: 13/001,745

(22) PCT Filed: Mar. 2, 2010

(86) PCT No.: PCT/JP2010/001413
§ 371 (c)(1),
(2), (4) Date: Dec. 28, 2010

(87) PCT Pub. No.: WO2010/103747
PCT Pub. Date: Sep. 16, 2010

(65) Prior Publication Data
US 2011/0101824 A1 May 5, 2011

(30) Foreign Application Priority Data

Mar. 12, 2009 (JP) .................. 2009-059928

(51) Int. Cl.
*A61B 8/00* (2006.01)
*B06B 1/02* (2006.01)
(Continued)

(52) U.S. Cl.
CPC .......... *G01S 7/5202* (2013.01); *B06B 1/0215* (2013.01); *G01S 7/52046* (2013.01); *G01S 15/8963* (2013.01)

(58) Field of Classification Search
CPC ............... G01S 7/52046; G01S 7/5202; G01S 15/8963; G01S 7/52047; B06B 1/0215
(Continued)

(56) References Cited

U.S. PATENT DOCUMENTS 5,680,381 A * 10/1997 Horimai ................. G11B 7/004
369/116
6,298,726 B1 10/2001 Adachi et al.
(Continued)

FOREIGN PATENT DOCUMENTS

JP 62-087141 4/1987
JP 9-234202 9/1997
(Continued)

OTHER PUBLICATIONS

Tang et al, A Computer-Controlled Ultrasound Pulser-Receiver System for Transkull Fluid Detection using a Shear Wave Transmission Technique, IEEE Trans Ultrasound Ferroelectr Freq Control, Jan. 9, 2008, pp. 1-25.*

*Primary Examiner* — Serkan Akar
(74) *Attorney, Agent, or Firm* — Lucas & Mercanti, LLP

(57) ABSTRACT

There are provided a transducer that irradiates an ultrasonic wave, a transmitter that drives the transducer, and a plurality of power sources that supply a plurality of positive voltages and negative voltages to the transmitter. The transmitter includes a plurality of switches (SW1 to SW4) that connect the power sources selectively, and a timing controller that controls a plurality of the switches. A driving pulse is generated through a selection of the switches. A plurality of the positive voltages and a plurality of the negative voltages have absolute values different from each other. With this configuration, it is possible to provide an ultrasonic diagnostic apparatus that allows the amplitude of the driving pulse to be varied in multiple stages, is low in cost, and requires small amounts of both material and control.

6 Claims, 7 Drawing Sheets

(51) Int. Cl.
*G01S 7/52* (2006.01)
*G01S 15/89* (2006.01)

(58) Field of Classification Search
USPC .......................................................... 600/459
See application file for complete search history.

(56) References Cited

U.S. PATENT DOCUMENTS

| | | |
|---|---|---|
| 8,138,823 B2 * | 3/2012 | Zang et al. ................... 327/540 |
| 2004/0254459 A1 | 12/2004 | Kristoffersen et al. |
| 2008/0264171 A1 * | 10/2008 | Wodnicki ........................ 73/618 |
| 2009/0171215 A1 * | 7/2009 | Kato ..................... A61B 8/467 |
| | | 600/458 |
| 2010/0019833 A1 * | 1/2010 | Zang et al. ................... 327/538 |

FOREIGN PATENT DOCUMENTS

| | | |
|---|---|---|
| JP | 2000-005180 | 1/2000 |
| JP | 2007-296131 | 11/2007 |
| WO | WO 99/03401 | 1/1999 |

* cited by examiner

ULTRASONIC DIAGNOSTIC APPARATUS WITH PULSE TIMING CONTROLLER

TECHNICAL FIELD

The present invention relates to an ultrasonic diagnostic apparatus that allows the amplitude of a driving pulse for driving a transducer to be variable:

BACKGROUND ART

An ultrasonic diagnostic apparatus irradiates the inside of a subject with ultrasonic waves from transducers and uses the ultrasonic waves reflected from the inside of the subject to display information concerning the form of an organ or the like or the flow of blood on a display portion. This principle is well known (for example, see Patent Document 1).

FIG. 7A is a diagram showing a configuration of a driving pulse generator disposed in a transmitter for driving a transducer in a conventional ultrasonic diagnostic apparatus. In the driving pulse generator, high-voltage switches SW11 and SW12 are connected in series, and a power terminal of +B [V] and a power terminal of −B [V] are connected to the other ends of the high-voltage switches SW11 and SW12, respectively. A node between the high-voltage switches SW11 and SW12 is connected to the transducer (not shown). Further, each of the high-voltage switches SW11 and SW12 is switch-controlled by a timing controller (not shown).

FIG. 7B is a waveform diagram showing a switching operation of the high-voltage switches SW11 and SW12 and a driving pulse train signal to be supplied to the transducer. A group of driving pulse trains shown in FIG. 7B forms an ultrasonic pulse for use in one scanning.

First, when the high-voltage switch SW11 is turned ON, a voltage of +B [V] is applied to the transducer. Then, when the high-voltage switch SW11 is turned OFF, and the high-voltage switch SW12 is turned ON, a voltage of −B [V] is applied to the transducer. By turning ON/OFF the high-voltage switches alternately in this manner, the driving pulse trains formed of a bipolar waveform of two waves are generated as shown in FIG. 7B.

In order to allow an ultrasonic diagnostic apparatus to have a higher resolution in the lateral direction, ultrasonic beams are preferably as thin as possible. This principle will be described herein for the case of transmission only, although the same applies to the case of reception.

As a well-known method for achieving thin ultrasonic beams, timings of the driving pulse trains to be output from a plurality of the transmitters connected to a plurality of the transducers are adjusted. It is known that when the ultrasonic pulses having the same amplitude are generated from all the transducers, low directivity is shown also in locations other than a principal axis, which is called a side lobe.

In order to suppress the side lobe, it is known to be effective to reduce the amplitude of the driving pulse to be supplied to the transducer at an end of an aperture, which is called apodization. In order to perform apodization, it is necessary to vary the amplitude of the driving pulse with the driving pulse generator depending on where the corresponding transducer is located in the aperture. Higher variability (number of stages in which the amplitude is varied) is more effective in suppressing the side lobe.

FIG. 8A is a diagram showing a configuration of the driving pulse generator that is capable of varying the amplitude of the driving pulse. FIG. 8B is a waveform diagram showing switching of high-voltage switches SW13 to SW16 and a driving pulse train signal. As shown in FIG. 8A, the driving pulse generator is configured so that a plurality of positive power terminals and a plurality of negative power terminals are connected to the transducer via the respective high-voltage switches SW13 to SW16. As shown in FIG. 8B, in accordance with the timing of switching the high-voltage switches SW13 to SW16, driving pulse trains having an amplitude of 2B2 [V] and driving pulse trains having an amplitude of 2B1 [V] are generated.

PRIOR ART DOCUMENT

Patent Document

Patent Document 1: JP 9 (1997)-234202 A

DISCLOSURE OF INVENTION

Problem to be Solved by the Invention

However, in order to allow the conventional ultrasonic diagnostic apparatus to output four different amplitudes, for example, it is necessary, as shown in FIG. 9, to provide a total of eight high-voltage switches, i.e., four high-voltage switches SW17 to SW20 on the positive side and four high-voltage switches SW21 to SW24 on the negative side, and further to supply eight control signals. In other words, in order to output a plurality of types of amplitudes, it is necessary to provide twice as many switches as the types of amplitudes to be obtained by the high-voltage switches on the positive side and the negative side, and also to provide circuits for generating twice as many control signals as the types of amplitudes. As a result, the ultrasonic diagnostic apparatus becomes larger in configuration and costly.

In order to solve the above-described conventional problem, it is an object of the present invention to provide an ultrasonic diagnostic apparatus that allows the amplitude of a driving pulse to be varied in multiple stages, is low in cost, and requires small amounts of both material and control.

Means for Solving Problem

A first ultrasonic diagnostic apparatus of the present invention includes: a transducer that irradiates an ultrasonic wave; a transmitter that drives the transducer; and a plurality of power sources that supply a plurality of positive voltages and negative voltages to the transmitter. The transmitter includes: a plurality of switches that connect the power sources selectively; and a timing controller that controls a plurality of the switches. A driving pulse is generated through a selection of the switches. In order to solve the above-described problem, a plurality of the positive voltages and a plurality of the negative voltages have absolute values different from each other.

A second ultrasonic diagnostic apparatus of the present invention includes: a transducer that irradiates an ultrasonic wave; a transmitter that drives the transducer; and a plurality of power sources that supply a plurality of positive voltages and negative voltages to the transmitter. The transmitter includes: a plurality of switches that connect the power sources selectively; and a timing controller that controls a plurality of the switches. A driving pulse is generated through a selection of the switches. In order to solve the above-described problem, among the power sources that supply the positive voltages and the power sources that supply the negative voltages, a part of the power sources supply the positive voltages and the negative voltages that have the same absolute value, while the remaining power sources supply a plurality of the positive voltages and a plurality of the negative voltages that have absolute values different from each other.

Effects of the Invention

According to the present invention, voltages to be output from power sources include positive voltages and negative voltages that have different absolute values. Thus, it is possible to provide an ultrasonic diagnostic apparatus that allows the amplitude of a driving pulse to be varied in multiple stages, is low in cost, and requires small amounts of both material and control.

DESCRIPTION OF THE INVENTION

The ultrasonic diagnostic apparatus of the present invention can assume various aspects. That is, in the first ultrasonic diagnostic apparatus, the power sources that supply a plurality of the positive voltages and the negative voltages can be configured such that a difference between a pair of one of a plurality of the positive voltages and one of a plurality of the negative voltages is not equal to a difference between another pair of any of the positive voltages and any of the negative voltages.

Further, a ratio between a voltage having a maximum absolute value and a voltage having a minimum absolute value, among a plurality of the positive voltages and the negative voltages, can be not more than 10.

Further, in the first and second ultrasonic diagnostic apparatuses, when a final driving pulse in driving pulse trains for allowing the ultrasonic pulse to be output from the transducer has a voltage whose absolute value is higher than a predetermined value, the timing controller can add a driving pulse of opposite polarity whose absolute value is smaller than the predetermined value to the rear of the final driving pulse. With this configuration, it is possible to make the voltage 0 [V] in a short time after the final driving pulse, preventing the ultrasonic pulse from having a long pulse length, thereby improving the resolution in the time direction.

Further, the timing controller can control the switches so that a polarity of a voltage to be supplied to the transducer is reversed alternately, and the voltage has an absolute value that increases gradually and then decreases gradually after reaching its maximum.

Hereinafter, the embodiment of an ultrasonic diagnostic apparatus of the present invention will be described with reference to FIGS. 1 to 6.

Embodiment 1

Figure 1:
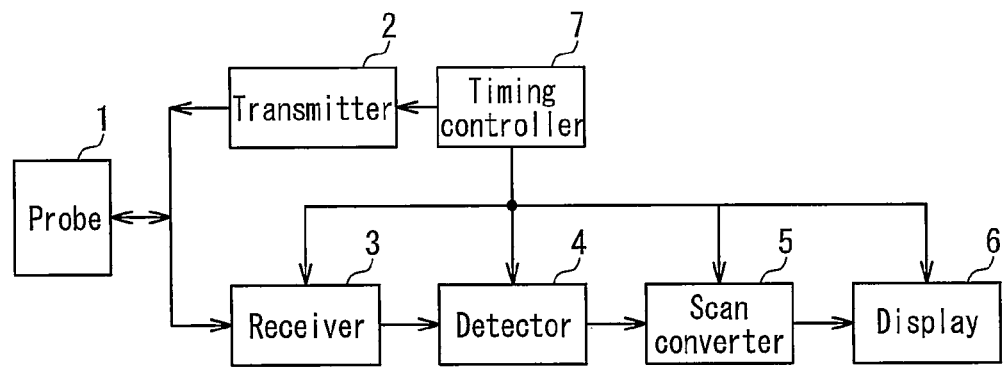
FIG. 1 is a block diagram showing a configuration of an ultrasonic diagnostic apparatus according to Embodiment 1 of the present invention.

FIG. 1 is a block diagram showing a configuration of an ultrasonic diagnostic apparatus according to Embodiment 1 of the present invention. A probe 1, which includes transducers, irradiates a subject (not shown) with an ultrasonic pulse when a driving pulse train signal is applied, and outputs a reception signal when receiving the reflected ultrasonic pulse (ultrasonic echo). A transmitter 2, which includes driving pulse generators for generating the driving pulse train signal, transmits the high-voltage driving pulse train signal to the transducers in the probe 1 under the control of a timing controller 7 to generate the ultrasonic pulse. It should be noted that a group of driving pulse trains in the driving pulse train signal forms the ultrasonic pulse for use in one transmission and reception. In a recent ultrasonic diagnostic apparatus, the probe 1 includes dozens to hundreds of the transducers, and the transmitter 2 includes a plurality of the driving pulse generators that correspond to the respective transducers.

The ultrasonic pulse output from the probe 1 is reflected by the inside of the subject, converted into an electric signal (reception signal) by each of the transducers in the probe 1 again, and input to a receiver 3. The receiver 3 amplifies the reception signal, and adds the reception signals from the respective transducers at matched timing. The reception signals added by the receiver 3 are input to a detector 4 to be detected.

The detected reception signals are scanned and converted into image data suitable for image display by a scan converter 5. The image data is displayed as an ultrasonic image by a display 6. The timing controller 7 controls the respective portions of the ultrasonic diagnostic apparatus, e.g., switching control of high-voltage switches of the transmitter 2 and delayed control in the receiver 3.

Figure 2:
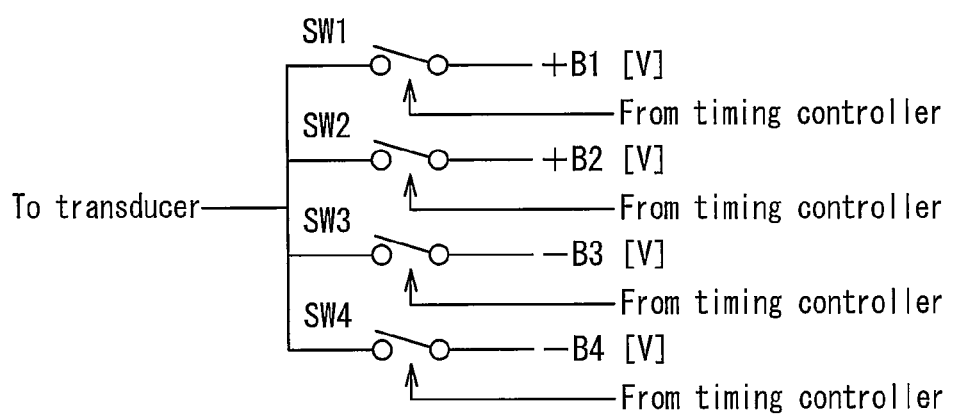
FIG. 2 is a circuit diagram showing a configuration of a driving pulse generator of the ultrasonic diagnostic apparatus according to the embodiment.

Next, a detailed description will be given of the driving pulse generators in the transmitter 2. FIG. 2 is a circuit diagram showing a configuration of one of a plurality of the driving pulse generators in the transmitter 2 of the ultrasonic diagnostic apparatus according to the present embodiment. The driving pulse generator is supplied with positive-side power voltages of +B1 [V] and +B2 [V] and negative-side power voltages of −B3 [V] and −B4 [V] that are set so as to satisfy a relationship of B1<B3<B2<B4.

Power voltages of +B1 [V], +B2 [V], −B3 [V], and −B4 [V] are supplied to the transducer via a high-voltage switch SW1, a high-voltage switch SW2, a high-voltage switch SW3, and a high-voltage switch SW4, respectively. The high-voltage switches SW1 to SW4 are switch-controlled by the timing controller 7.

Figure 3:
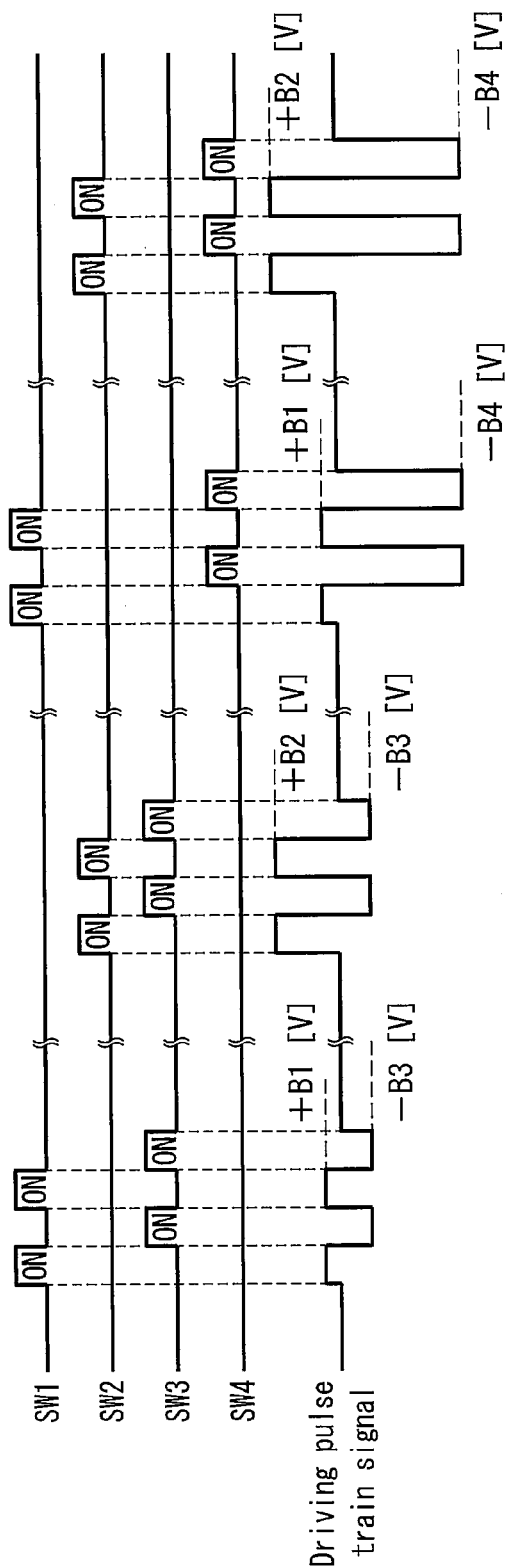
FIG. 3 is a waveform diagram of a driving pulse train signal output from the driving pulse generator of the ultrasonic diagnostic apparatus according to the embodiment.

The following description is directed to an operation of the driving pulse generators in the transmitter 2. FIG. 3 is a waveform diagram showing switching of the high-voltage switches SW1 to SW4 and the driving pulse train signal to be output.

First, when the timing controller 7 turns ON/OFF the high-voltage switches SW1 and SW3 alternately, driving pulse trains having a relatively small amplitude of (B1+B3) [V] are obtained. Further, when the timing controller 7 turns ON/OFF the high-voltage switches SW2 and SW3 alternately, driving pulse trains having an amplitude of (B2+B3) [V] are obtained. Further, when the timing controller 7 turns ON/OFF the high-voltage switches SW1 and SW4 alternately, driving pulse trains having an amplitude of (B1+B4) [V] are obtained. Further, when the timing controller 7 turns ON/OFF the high-voltage switches SW2 and SW4 alternately, driving pulse trains having a relatively large amplitude of (B2+B4) [V] are obtained.

It should be noted that although these four types of waveforms differ in DC level, the transducer can be operated without problems because it is not driven with direct current.

Specific values of B1 to B4 may be as follows, for example: B1=10 [V], B2=40 [V], −B3=−20 [V], and −B4=−80 [V]. In this case, a combination of these voltage values results in four different amplitudes of 30 [V] (B1+B3), 60 [V] (B2+B3), 90 [V] (B1+B4), and 120 [V] (B2+B4).

There is a limit to the voltage values to be combined in relation to the ratio between the respective voltage values. When the ratio between the voltage values is extremely large, with a positive-side voltage value being 100 [V] and a negative-side voltage value being 1 [V], for example, the resulting waveform is closely analogous to that obtained by using a unipolar pulse, so that the symmetry on the frequency axis (frequency characteristics) is destroyed. It has been found that in order to prevent the destruction of the symmetry, the ratio between the voltages on the positive side and the negative side desirably is not more than 10 on an experimental basis.

As described above, due to the power terminals supplied with four different voltages and the switching of the four high-voltage switches, the driving pulse trains having four types of amplitudes can be generated. Namely, the ultrasonic diagnostic apparatus according to the present embodiment can select many amplitudes of the driving pulse trains with a small circuit scale. Therefore, by adjusting the amplitude of the driving pulse trains to be supplied to the transducer depending on where it is located in an ultrasonic aperture, it becomes possible to perform the operation for reducing a side lobe with a simplified circuit.

Embodiment 2

An ultrasonic diagnostic apparatus according to Embodiment 2 of the present invention is the same in configuration as the ultrasonic diagnostic apparatus according to Embodiment 1 but is different in operation. In the following description, the same components as those of the ultrasonic diagnostic apparatus according to Embodiment 1 are denoted with the same reference numerals, and the description thereof will be omitted.

Figure 4:
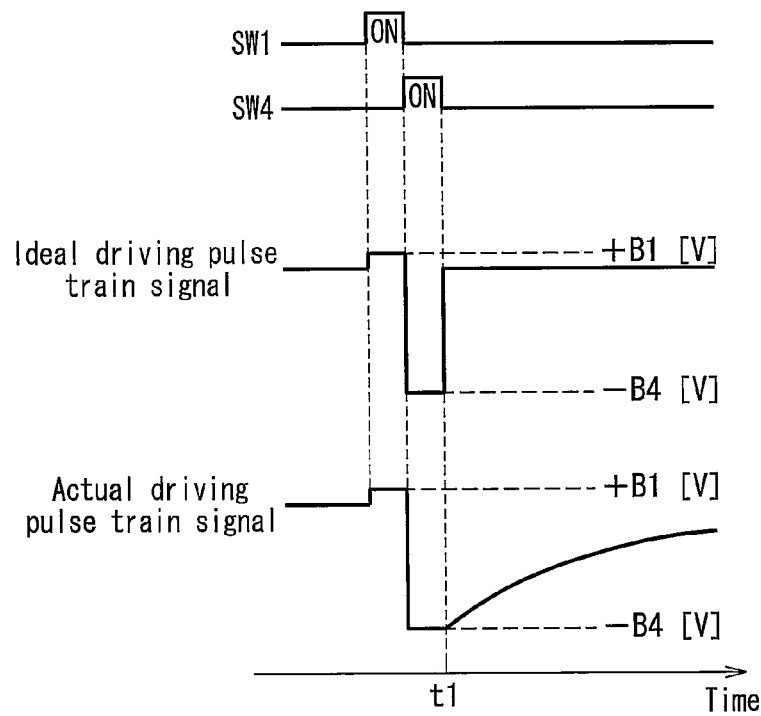
FIG. 4 is an output waveform diagram showing an ideal waveform and an actual waveform of the driving pulse train signal output from the driving pulse generator of the ultrasonic diagnostic apparatus according to the embodiment.

In the ultrasonic diagnostic apparatus according to Embodiment 1, when a final driving pulse in the driving pulse trains has a large absolute value, it takes time to effect a shift from the potential of the final driving pulse to 0 [V]. FIG. 4 is a waveform diagram showing an ideal waveform and an actual waveform when the final driving pulse in the driving pulse trains has a potential of −B4 [V]. When the high-voltage switch SW4 is turned OFF at a time t1, it is ideal that the potential shifts to 0 [V] immediately, but the potential actually shifts to 0 [V] gradually.

This is because when all the high-voltage switches SW1 to SW4 are turned OFF in the driving pulse generator, charges between the transducer and the high-voltage switches SW1 to SW4 cannot be discharged immediately, i.e., charges are isolated from ground. This leads to a problem of the amplitude of the final driving pulse practically becoming smaller, and frequency characteristics are changed with a decrease in the intensity of the ultrasonic pulse.

This problem arises more pronouncedly when a group of driving pulse trains includes fewer driving pulses and when the final driving pulse in the driving pulse trains has a larger amplitude relative to 0 [V]. In other words, when the last two driving pulses in the driving pulse trains respectively have a "large" amplitude and a "small" amplitude relative to 0 [V] in this order, the intensity of the ultrasonic pulse decreases less, whereas when these driving pulses respectively have a "small" amplitude and a "large" amplitude in this order, the intensity of the ultrasonic pulse decreases more.

Figure 5:
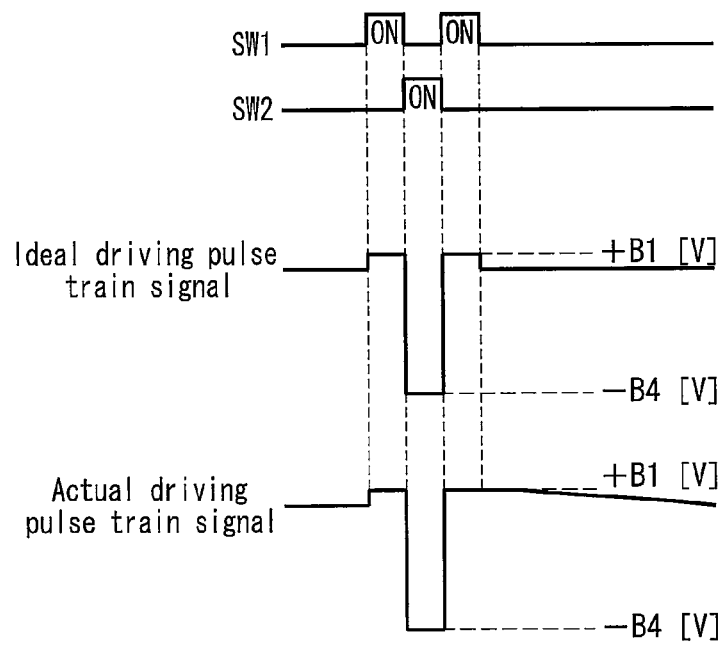
FIG. 5 is an output waveform diagram showing an ideal waveform and an actual waveform of a driving pulse train signal output from a driving pulse generator of an ultrasonic diagnostic apparatus according to Embodiment 2 of the present invention.

In order to handle the case where a "small" amplitude and a "large" amplitude appear in this order, another driving pulse having a "small" amplitude is provided after the driving pulses respectively having a "small" amplitude and a "large" amplitude, resulting in the driving pulses respectively having a "small" amplitude, a "large" amplitude, and a "small" amplitude as shown in FIG. 5. This allows the driving pulse having a "large" amplitude to be converged easily to 0 [V], and makes it possible as a whole to maintain the accuracy of the intensity of the ultrasonic pulse because the driving pulse having a "small" amplitude that is provided additionally is not so high in energy.

It should be noted that a pulse having a "small" amplitude that is provided additionally may not have the same length as the other pulses. As long as the potential can be converged, a short pulse length is also available.

However, the above-described method has one problem in phase-inversion harmonic imaging. Herein, the harmonic imaging uses harmonic components of ultrasonic waves that are generated inside the subject by irradiation of the ultrasonic waves. Further, the phase-inversion is a mode in which a driving pulse is transmitted and received twice in the same direction with its polarity reversed, and a fundamental wave is cancelled out, whereby harmonic components are extracted.

The above-described problem is that the polarity reversal of the driving pulse, which is necessary in the phase-inversion, cannot be performed. Thus, the sum of reversed waveforms does not have a sufficiently small value, resulting in a defective ultrasonic diagnostic image.

In order to solve this problem, among voltages of +B1 [V], +B2 [V], −B3 [V], and −B4 [V], voltages of +B2 [V] and −B4 [V] may be made to have the same absolute value. As a result, among voltages of +B1 [V], +B2 [V], −B3 [V], and −B2 [V], voltages of +B2 [V] and −B2 [V] may be used in the phase-inversion to address this problem.

Embodiment 3

An ultrasonic diagnostic apparatus according to Embodiment 3 of the present invention has the same configuration as the ultrasonic diagnostic apparatus according to Embodiment 1, and thus the same reference numerals are assigned, and the description thereof will be omitted. The ultrasonic diagnostic apparatus according to the present embodiment is different from the ultrasonic diagnostic apparatus according to Embodiment 1 in the switching operation of the high-voltage switches.

Techniques of the harmonic imaging include a filter mode in addition to the phase-inversion (mode) described in Embodiment 1. The filter mode is a mode in which fundamental wave components are eliminated from the reception signal using a high pass filter, whereby harmonic components are extracted to be displayed as an ultrasonic image. Thus, when the ultrasonic pulse to be irradiated itself includes harmonic waves, the quality of the resulting image will be degraded.

Figure 6:
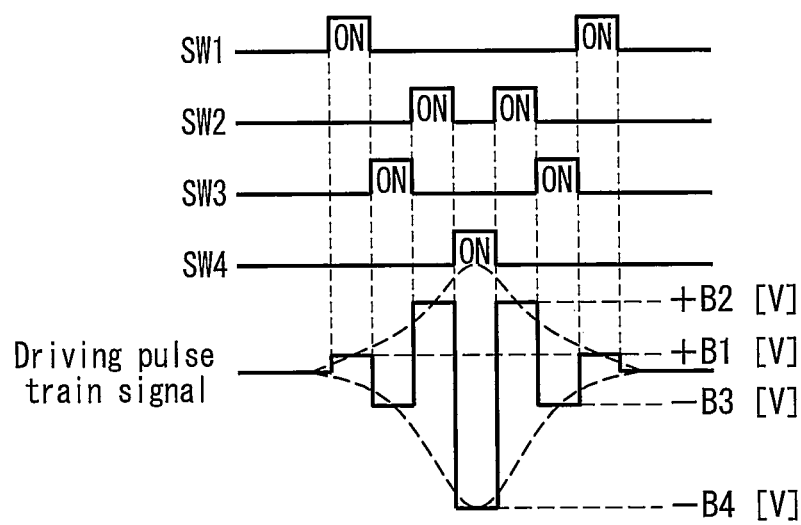
FIG. 6 is a waveform diagram of a driving pulse train signal output from a driving pulse generator of an ultrasonic diagnostic apparatus according to Embodiment 3 of the present invention.
Figure 7A:
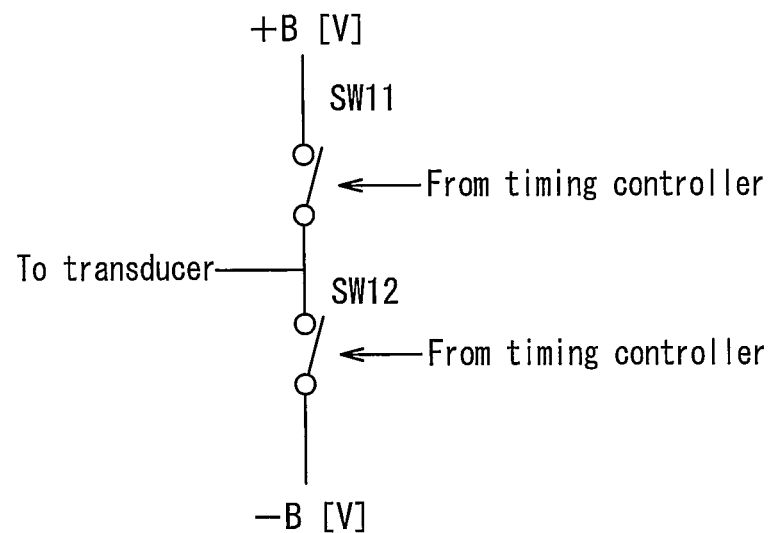
FIG. 7A is a circuit diagram showing a configuration of a driving pulse generator of a conventional ultrasonic diagnostic apparatus.
Figure 7B:
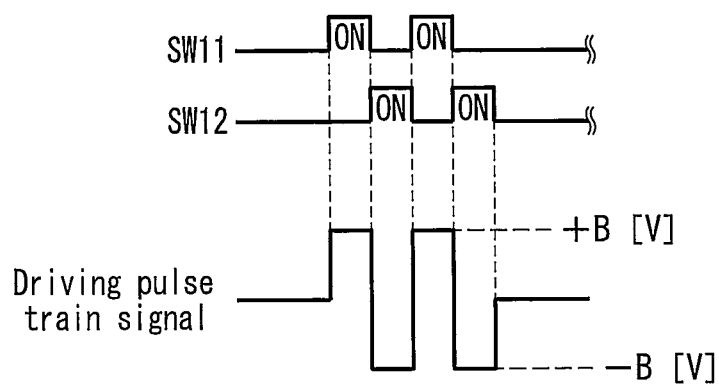
FIG. 7B is a waveform diagram of a driving pulse train signal output from the driving pulse generator of the conventional ultrasonic diagnostic apparatus.
Figure 8A:
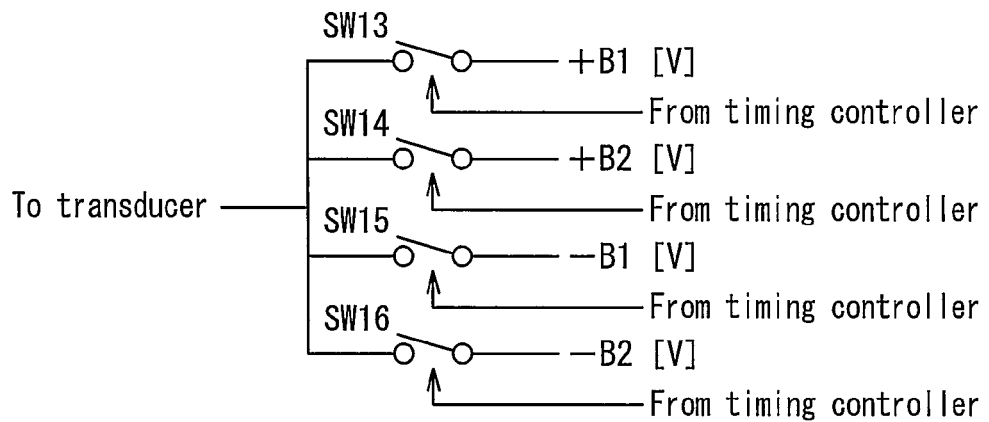
FIG. 8A is a circuit diagram showing a configuration of a driving pulse generator of the conventional ultrasonic diagnostic apparatus.
Figure 8B:
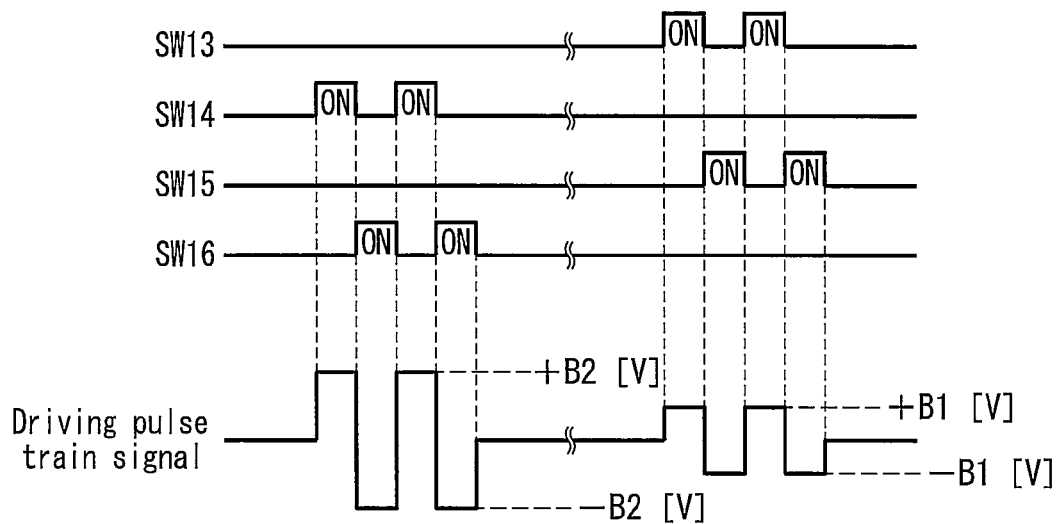
FIG. 8B is a waveform diagram of a driving pulse train signal output from the driving pulse generator of the conventional ultrasonic diagnostic apparatus.
Figure 9:
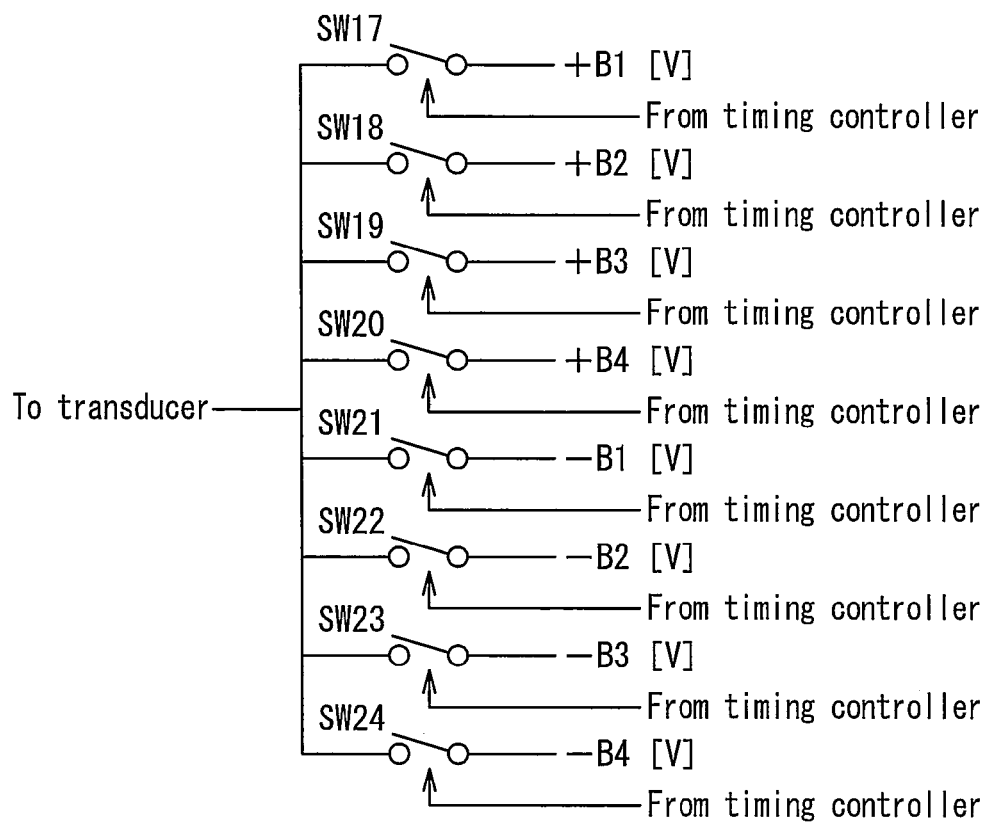
FIG. 9 is a circuit diagram showing a configuration of a driving pulse generator of the conventional ultrasonic diagnostic apparatus.

FIG. 6 is a waveform diagram of driving pulse trains output from the driving pulse generator of the ultrasonic diagnostic apparatus according to the present embodiment. The driving pulse generator has the same configuration as that shown in FIG. 1. First, among the high-voltage switches SW1 to SW4 that are OFF, the high-voltage switch SW1 is turned ON by the timing controller 7. Accordingly, the driving pulse has a potential of B1 [V]. Then, the high-voltage switch SW1 is turned OFF, and the high-voltage switch SW3 is turned ON. Accordingly, the potential of the driving pulse decreases by (B1+B3) [V] to be −B3 [V].

Thereafter, the high-voltage switch SW3 is turned OFF, and the high-voltage switch SW2 is turned ON. Accordingly, the potential of the driving pulse increases by (B3+B2) [V] to be B2 [V]. Then, the high-voltage switch SW2 is turned OFF, and the high-voltage switch SW4 is turned ON. Accordingly, the potential of the driving pulse decreases by (B4+B2) [V] to be −B4 [V].

After that, the high-voltage switch SW4 is turned OFF, and the high-voltage switch SW2 is turned ON. Accordingly, the potential of the driving pulse increases by (B4+B2) [V] to be B2 [V]. Then, the high-voltage switch SW2 is turned OFF, and the high-voltage switch SW3 is turned ON. Accordingly, the potential of the driving pulse decreases by (B3+B2) [V] to be −B3 [V].

Afterwards, the high-voltage switch SW3 is turned OFF, and the high-voltage switch SW1 is turned ON. Accordingly, the potential of the driving pulse increases by (B3+B1) [V] to be B1 [V]. Then, the high-voltage switch SW1 is turned OFF. Accordingly, the potential of the driving pulse becomes 0 [V].

Thus, the driving pulse trains generated from the driving pulse form a smooth envelope waveform in which the amplitude increases gradually and then decreases gradually after reaching its maximum as shown by the broken line. Since the ultrasonic pulse is generated from these driving pulse trains, harmonic components in the ultrasonic pulse can be suppressed.

As described above, the ultrasonic diagnostic apparatus according to the present embodiment can suppress harmonic components in the ultrasonic pulse in the filter harmonic imaging. Thus, the harmonic components extracted from the reception signal include a smaller amount of harmonic components that are included in the irradiated ultrasonic pulse. Therefore, it is possible to suppress degradation of the quality of an ultrasonic image to be displayed.

In Embodiments 1 to 3, the two high-voltage switches are provided on each of the positive side and the negative side. However, it should be understood that the present invention can be implemented by providing another number of high-voltage switches on each of the sides.

INDUSTRIAL APPLICABILITY

With a configuration in which positive-side power sources and negative-side power sources output voltages of different absolute values, the present invention is applicable as an ultrasonic diagnostic apparatus that requires small amounts of both material and control, is low in cost, and allows the amplitude of a driving pulse to be varied in multiple stages.

EXPLANATION OF LETTERS OR NUMERALS

1 Probe
2 Transmitter
3 Receiver
4 Detector
5 Scan converter
6 Display
7 Timing controller
SW1-SW4 High-voltage switch

The invention claimed is:
1. An ultrasonic diagnostic apparatus comprising:
a plurality of transducers configured to irradiate an ultrasonic wave;
a transmitter configured to drive the plurality of transducers; and
a plurality of power sources configured to supply a plurality of positive voltages and negative voltages to the transmitter, wherein at least one voltage of either the plurality of positive voltages or the plurality of negative voltages has an absolute value different from any one of the plurality of the other voltages,
wherein the transmitter comprises:
a plurality of switches configured to connect the power sources selectively; and
a timing controller configured to selectively turn ON/OFF the plurality of switches of the transmitter to produce a driving pulse;
wherein the timing controller is configured to turn ON/OFF an odd numbered switch and an even numbered switch of the plurality of switches alternately to generate a pulse-pair sequentially in a plurality of pulses, the pulse-pair including an even pulse and an odd pulse continuously next to the even pulse, a voltage of the odd pulse is driven with one of the plurality of positive voltages and negative voltages, a voltage of the even pulse is driven by another of the plurality of positive voltages and negative voltages different from the voltage of the odd pulse, and the absolute value of the voltage of the even pulse is different from the absolute value of the voltage of the odd pulse, and
wherein when a final driving pulse in driving pulse trains for allowing the ultrasonic pulse to be output from the plurality of transducers has a voltage whose absolute value is higher than a predetermined value, the timing controller configured to add a driving pulse of opposite polarity whose absolute value is smaller than the predetermined value to the rear of the final driving pulse.
2. The ultrasonic diagnostic apparatus according to claim 1, wherein each voltage difference between one of the plurality of the positive voltages and one of the plurality of the negative voltages is not equal to any other voltage difference between any other two voltages of the plurality of the positive voltages and the plurality of the negative voltages.

3. The ultrasonic diagnostic apparatus according to claim 1, wherein a ratio between a voltage having a maximum absolute value and a voltage having a minimum absolute value, among a plurality of the positive voltages and the negative voltages, is not more than 10.

4. The ultrasonic diagnostic apparatus according to claim 1, wherein the timing controller configured to control the switches so that a polarity of a voltage to be supplied to the plurality of transducers is reversed alternately, and the voltage has an absolute value that increases gradually and then decreases gradually after reaching its maximum.

5. The ultrasonic diagnostic apparatus according to claim 2, wherein the timing controller configured to control the switches so that a polarity of a voltage to be supplied to the plurality of transducers is reversed alternately, and the voltage has an absolute value that increases gradually and then decreases gradually after reaching its maximum.

6. The ultrasonic diagnostic apparatus according to claim 1, wherein the transmitter is configured to adjust the amplitude of the driving pulse trains to be supplied to each of the transducers depending on where each of the transducers is located in an ultrasonic aperture by controlling the plurality of switches.

* * * * *